United States Patent
Konno

(10) Patent No.: US 11,319,416 B2
(45) Date of Patent: May 3, 2022

(54) MASTERBATCH MANUFACTURING METHOD, RUBBER COMPOSITION MANUFACTURING METHOD, AND TIRE MANUFACTURING METHOD

(71) Applicant: TOYO TIRE CORPORATION, Itami (JP)

(72) Inventor: Yuya Konno, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 154 days.

(21) Appl. No.: 16/954,674

(22) PCT Filed: Nov. 7, 2018

(86) PCT No.: PCT/JP2018/041332
§ 371 (c)(1),
(2) Date: Jun. 17, 2020

(87) PCT Pub. No.: WO2019/123870
PCT Pub. Date: Jun. 27, 2019

(65) Prior Publication Data
US 2020/0354530 A1   Nov. 12, 2020

(30) Foreign Application Priority Data

Dec. 21, 2017   (JP) .............................. JP2017-244790

(51) Int. Cl.
*C08J 3/22* (2006.01)
*B29D 30/06* (2006.01)
*C08K 3/04* (2006.01)
*C08K 5/00* (2006.01)
*C08L 7/02* (2006.01)

(52) U.S. Cl.
CPC ................ *C08J 3/22* (2013.01); *B29D 30/06* (2013.01); *C08K 3/04* (2013.01); *C08K 5/0025* (2013.01); *C08L 7/02* (2013.01); *C08L 2205/02* (2013.01)

(58) Field of Classification Search
CPC . C08J 3/22; C08K 3/04; C08K 5/0025; C08L 7/02; C08L 2205/02; B29D 30/06
See application file for complete search history.

(56) References Cited

FOREIGN PATENT DOCUMENTS

| JP | 10-306176 A | 11/1998 |
|---|---|---|
| JP | 2003-313366 A | 11/2003 |
| JP | 2012-158668 A | 8/2012 |
| JP | 2013-23641 A | 2/2013 |
| JP | 2013-91688 A | 5/2013 |
| JP | 2013-181051 A | 9/2013 |
| JP | 2017-88747 A | 5/2017 |

OTHER PUBLICATIONS

JP 2017-088747 machine translation (Year: 2017).*
JP 2013-181051 machine translation (Year: 2013).*
Notification of Transmittal of Translation of the International Preliminary Report on Patentability (Form PCT/IB/338) issued in counterpart International Application No. PCT/JP2018/041332 dated Jul. 2, 2020 with Forms PCT/IB/373 and PCT/ISA/237. (7 pages).
International Search Report dated Feb. 12, 2019, issued in counterpart application No. PCT/JP2018/041332 (2 pages).

* cited by examiner

*Primary Examiner* — Edward J Cain
(74) *Attorney, Agent, or Firm* — WHDA, LLP

(57) ABSTRACT

A masterbatch manufacturing method comprising: an operation in which a natural rubber latex, and a rubber latex having a mass-average molecular weight that is less than a mass-average molecular weight of the natural rubber latex, are mixed to obtain a pre-slurry-mixing rubber latex for which a mass-average-molecular-weight-to-number-average-molecular-weight ratio is 6 to 10; an operation in which the pre-slurry-mixing rubber latex and a filler slurry are mixed to obtain a pre-coagulation liquid mixture; and an operation in which the pre-coagulation liquid mixture is coagulated.

15 Claims, No Drawings

MASTERBATCH MANUFACTURING METHOD, RUBBER COMPOSITION MANUFACTURING METHOD, AND TIRE MANUFACTURING METHOD

TECHNICAL FIELD

The present disclosure relates to a masterbatch manufacturing method, rubber composition manufacturing method, and tire manufacturing method.

BACKGROUND ART

Because wet masterbatches in which carbon black is dispersed in natural rubber have high Mooney viscosity and poor workability, improvement in workability is desired. Wet masterbatch may be obtained, for example, by causing natural rubber latex and carbon black slurry to be mixed, and by causing this to be coagulated and dewatered.

PRIOR ART REFERENCES

Patent References

PATENT REFERENCE NO. 1: Japanese Patent Application Publication Kokai No. 2013-181051

SUMMARY OF INVENTION

Problem to be Solved by Invention

However, consideration should be given not only to improvement of workability but also, for example, to the properties, e.g., tear strength, of vulcanized rubber.

It is an object of the present disclosure to provide a method for manufacturing masterbatch that will make it possible to improve workability and that will permit improvement in the tear strength of vulcanized rubber.

Means for Solving Problem

A masterbatch manufacturing method in accordance with the present disclosure comprises an operation in which natural rubber latex, and rubber latex having a mass-average molecular weight that is less than the mass-average molecular weight of the natural rubber latex, are mixed to obtain pre-slurry-mixing rubber latex for which the mass-average-molecular-weight-to-number-average-molecular-weight ratio is 6 to 10; an operation in which the pre-slurry-mixing rubber latex and a filler slurry are mixed to obtain a pre-coagulation liquid mixture; and an operation in which the pre-coagulation liquid mixture is coagulated.

EMBODIMENTS FOR CARRYING OUT INVENTION

A masterbatch manufacturing method in an embodiment in accordance with the present disclosure comprises an operation in which natural rubber latex, and rubber latex having a mass-average molecular weight that is less than the mass-average molecular weight of the natural rubber latex, are mixed to obtain pre-slurry-mixing rubber latex for which the mass-average-molecular-weight-to-number-average-molecular-weight ratio, i.e., Mw/Mn, is 6 to 10; an operation in which the pre-slurry-mixing rubber latex and a filler slurry are mixed to obtain a pre-coagulation liquid mixture; and an operation in which the pre-coagulation liquid mixture is coagulated.

A masterbatch manufacturing method in an embodiment in accordance with the present disclosure will permit improvement in workability. A masterbatch manufacturing method in an embodiment in accordance with the present disclosure is such that because natural rubber latex, and rubber latex having a mass-average molecular weight that is less than the mass-average molecular weight of the natural rubber latex, are mixed, it is possible to reduce the Mooney viscosity of the masterbatch, and/or of the unvulcanized rubber fabricated with the masterbatch, as compared with that which would exist were this rubber latex not added thereto. Moreover, a masterbatch manufacturing method in an embodiment in accordance with the present disclosure is such that because Mw/Mn of the pre-slurry-mixing rubber latex is 6 to 10, it is possible to effectively reduce Mooney viscosity.

A masterbatch manufacturing method in an embodiment in accordance with the present disclosure will permit improvement in the tear strength of vulcanized rubber. It is thought that the reason for this may be that because a masterbatch manufacturing method in an embodiment in accordance with the present disclosure makes it possible to reduce the Mooney viscosity of the masterbatch, and/or of the unvulcanized rubber fabricated with the masterbatch, this may make it possible to reduce occurrence of excessive breakage of molecular chains in rubber during kneading.

A rubber composition manufacturing method in an embodiment in accordance with the present disclosure comprises a masterbatch manufacturing method in an embodiment in accordance with the present disclosure. More specifically, a rubber composition manufacturing method in an embodiment in accordance with the present disclosure comprises an operation in which natural rubber latex, and rubber latex having a mass-average molecular weight that is less than the mass-average molecular weight of the natural rubber latex, are mixed to obtain pre-slurry-mixing rubber latex for which the mass-average-molecular-weight-to-number-average-molecular-weight ratio is 6 to 10; an operation in which the pre-slurry-mixing rubber latex and a filler slurry are mixed to obtain a pre-coagulation liquid mixture; and an operation in which the pre-coagulation liquid mixture is coagulated.

A tire manufacturing method in an embodiment in accordance with the present disclosure comprises a masterbatch manufacturing method in an embodiment in accordance with the present disclosure. More specifically, a tire manufacturing method in an embodiment in accordance with the present disclosure comprises an operation in which natural rubber latex, and rubber latex having a mass-average molecular weight that is less than the mass-average molecular weight of the natural rubber latex, are mixed to obtain pre-slurry-mixing rubber latex for which the mass-average-molecular-weight-to-number-average-molecular-weight ratio is 6 to 10; an operation in which the pre-slurry-mixing rubber latex and a filler slurry are mixed to obtain a pre-coagulation liquid mixture; and an operation in which the pre-coagulation liquid mixture is coagulated.

In an embodiment in accordance with the present disclosure, filler may be carbon black, silica, clay, talc, calcium carbonate, magnesium carbonate, aluminum hydroxide, and/or other such inorganic filler(s). Any one or a plurality may be chosen from thereamong and used.

Embodiment 1

A first embodiment in accordance with the present disclosure will now be described. The first embodiment employs carbon black as filler for masterbatch.

A tire manufacturing method in accordance with a first embodiment comprises an operation in which natural rubber latex, and rubber latex having a mass-average molecular weight that is less than the mass-average molecular weight of the natural rubber latex, are mixed to obtain pre-slurry-mixing rubber latex; an operation in which the pre-slurry-mixing rubber latex and a carbon black slurry are mixed to obtain a pre-coagulation liquid mixture; an operation in which the pre-coagulation liquid mixture is coagulated to obtain a masterbatch; an operation in which the masterbatch and compounding ingredient(s) are kneaded to obtain a rubber mixture; an operation in which vulcanizing-type compounding ingredient(s) are kneaded into the rubber mixture to obtain a rubber composition; and an operation in which an unvulcanized tire fabricated from the rubber composition is vulcanized and molded.

The tire member manufacturing method in accordance with the first embodiment comprises an operation in which natural rubber latex, and rubber latex having a mass-average molecular weight that is less than the mass-average molecular weight of the natural rubber latex, are mixed to obtain pre-slurry-mixing rubber latex. During this operation, rubber latex is added to natural rubber latex and this is agitated to obtain pre-slurry-mixing rubber latex. The difference between the mass-average molecular weight of the natural rubber latex and the mass-average molecular weight of the rubber latex might, for example, be 1,000,000 to 1,700,000.

In the natural rubber latex, rubber particles comprising natural rubber are dispersed in colloidal fashion in water. To be specific, the mass-average molecular weight of the natural rubber latex might, for example, be such that the mass-average molecular weight of natural rubber within the natural rubber latex is not less than 2,000,000. It is preferred that dry rubber content of the natural rubber latex be not less than 10 mass %, and more preferred that this be not less than 20 mass %. The upper limit of the range in values for the dry rubber content of the natural rubber latex might, for example, be 60 mass %, it being preferred that this be 40 mass %, and it being more preferred that this be 30 mass %.

The rubber latex for mixing with the natural rubber latex has a mass-average molecular weight that is less than the mass-average molecular weight of the natural rubber latex. To be specific, the mass-average molecular weight of the rubber latex might, for example, be such that the mass-average molecular weight of rubber within the rubber latex is not greater than 1,200,000, is not greater than 1,000,000, or is not greater than 900,000. The lower limit of the range in values for the mass-average molecular weight of the rubber latex might, for example, be 100,000, 200,000, 300,000, or 400,000. In the rubber latex, rubber particles are dispersed in colloidal fashion in water. The rubber latex might be diene rubber latex, it being possible, for example, for this to be depolymerized natural rubber latex, isoprene rubber latex, styrene-butadiene rubber latex, butadiene rubber latex, nitrile rubber latex, and/or chloroprene rubber latex. Depolymerized natural rubber latex might, for example, be obtained by a method in which a peroxide is added to natural rubber latex, a method in which natural rubber latex is irradiated with ultraviolet light, or the like. Dry rubber content of the rubber latex might, for example, be 10 mass % to 60 mass %.

During the mixing of the natural rubber latex and the rubber latex, for every 100 parts by mass of dry rubber content in the natural rubber latex, it is preferred that the dry rubber content of the rubber latex be not less than 10 parts by mass, and more preferred that this be not less than 20 parts by mass. For every 100 parts by mass of dry rubber content in the natural rubber latex, it is preferred that the dry rubber content of the rubber latex be not greater than 70 parts by mass, and more preferred that this be not greater than 50 parts by mass.

In the pre-slurry-mixing rubber latex, rubber particles are dispersed in colloidal fashion in water. In the pre-slurry-mixing rubber latex, the mass-average-molecular-weight-to-number-average-molecular-weight ratio, i.e., Mw/Mn, is 6 to 10. On the other hand, to be specific, the mass-average molecular weight of the pre-slurry-mixing rubber latex might, for example, be such that the mass-average molecular weight of rubber within the pre-slurry-mixing rubber latex is 1,300,000 to 1,700,000.

The tire manufacturing method in accordance with the first embodiment comprises an operation in which the pre-slurry-mixing rubber latex and the carbon black slurry are mixed to obtain a pre-coagulation liquid mixture. These may be mixed using a high-shear mixer, homomixer, ball mill, bead mill, high-pressure homogenizer, ultrasonic homogenizer, colloid mill, and/or other such ordinary disperser.

In the carbon black slurry, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %. The carbon black slurry might, for example, be obtained by mixing carbon black and water. As examples of carbon black, besides SAF, ISAF, HAF, FEF, GPF, and/or other such carbon blacks, acetylene black, Ketchen black, and/or other such electrically conductive carbon blacks may be used. The carbon black may be nongranulated carbon black or may be granulated carbon black that has been granulated based upon considerations related to the handling characteristics thereof. The carbon black and the water may be mixed using a high-shear mixer, homomixer, ball mill, bead mill, high-pressure homogenizer, ultrasonic homogenizer, colloid mill, and/or other such ordinary disperser.

The pre-coagulation liquid mixture comprises rubber particles and carbon black. In the pre-coagulation liquid mixture, these are dispersed in water. For every 100 parts by mass of dry rubber content in the pre-coagulation liquid mixture, the amount of carbon black in the pre-coagulation liquid mixture might, for example, be not less than 10 parts by mass, might be not less than 20 parts by mass, might be not less than 30 parts by mass, or might be not less than 40 parts by mass. For every 100 parts by mass of dry rubber content in the pre-coagulation liquid mixture, the amount of carbon black in the pre-coagulation liquid mixture might, for example, be not greater than 80 parts by mass, might be not greater than 70 parts by mass, or might be not greater than 60 parts by mass.

The tire manufacturing method in accordance with the first embodiment comprises an operation in which the pre-coagulation liquid mixture is coagulated to obtain a masterbatch. Coagulation may be made to occur as a result of causing the pre-coagulation liquid mixture to dry. Or coagulation may be made to occur as a result of adding coagulant to the pre-coagulation liquid mixture. The coagulant might, for example, be an acid. As the acid, formic acid, sulfuric acid, and the like may be cited as examples. The coagulum obtained by coagulation of the pre-coagulation liquid mixture contains water. This operation (the operation in which the pre-coagulation liquid mixture is coagulated to obtain the masterbatch) may therefore comprise dewatering of the coagulum. An extruder, vacuum dryer, air dryer, and/or the like might, for example, be used to dewater the coagulum. It is preferred that water content of the dewatered coagulum be not greater than 15 mass %, and more preferred that this be not greater than 10 mass %. This operation may comprise molding of the coagulum following dewatering thereof. The masterbatch thus obtained comprises rubber and carbon black.

The masterbatch comprises rubber. The rubber in the masterbatch comprises at least natural rubber. The amount of natural rubber in the masterbatch might be not less than 50 mass %, or might be not less than 60 mass %, per 100 mass % of the rubber within the masterbatch, for example. Furthermore, the rubber in the masterbatch may comprise isoprene rubber. Where this is the case, the amount of isoprene rubber in the masterbatch might be not less than 10 mass %, or might be not less than 20 mass %, per 100 mass % of the rubber within the masterbatch, for example. The amount of isoprene rubber in the masterbatch might be not greater than 50 mass %, or might be not greater than 40 mass %, per 100 mass % of the rubber within the masterbatch, for example.

The masterbatch further comprises carbon black. For every 100 parts by mass of rubber within the masterbatch, it is preferred that the amount of carbon black be not less than 10 parts by mass, more preferred that this be not less than 20 parts by mass, and still more preferred that this be not less than 30 parts by mass. For every 100 parts by mass of rubber within the masterbatch, it is preferred that the amount of carbon black be not greater than 80 parts by mass, and more preferred that this be not greater than 60 parts by mass.

The tire manufacturing method in accordance with the first embodiment comprises an operation in which the masterbatch and compounding ingredient(s) are kneaded together to obtain a rubber mixture. As the compounding ingredient(s), filler, stearic acid, zinc oxide (flowers of zinc), antioxidant, wax, and/or the like may be cited as examples. Any one or a plurality may be chosen from thereamong and kneaded together with the masterbatch. As antioxidant, aromatic-amine-type antioxidant, amine-ketone-type antioxidant, monophenol-type antioxidant, bisphenol-type antioxidant, polyphenol-type antioxidant, dithiocarbamate-type antioxidant, thiourea-type antioxidant, and the like may be cited as examples. During this kneading operation, other rubber(s) may be kneaded therein together with the masterbatch and compounding ingredient(s). As rubber that may be added to the masterbatch during kneading, natural rubber, isoprene rubber, styrene-butadiene rubber, nitrile rubber, chloroprene rubber, and the like may be cited as examples. Kneading may be carried out using a kneader. As the kneader, internal kneaders, open roll mills, and the like may be cited as examples. As an internal kneader, Banbury mixers, kneaders, and the like may be cited as examples.

The tire manufacturing method in accordance with the first embodiment further comprises an operation in which a vulcanizing-type compounding ingredient is kneaded into the rubber mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As examples of the sulfur, powdered sulfur, precipitated sulfur, insoluble sulfur, high dispersing sulfur, and the like may be cited. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises rubber originating from the masterbatch. The amount of rubber originating from the masterbatch might be not less than 40 mass %, might be not less than 60 mass %, might be not less than 80 mass %, or might be 100 mass %, per 100 mass % of the rubber within the rubber composition, for example.

The rubber composition comprises carbon black. For every 100 parts by mass of rubber within the rubber composition, it is preferred that the amount of carbon black be not less than 10 parts by mass, more preferred that this be not less than 20 parts by mass, and still more preferred that this be not less than 30 parts by mass. For every 100 parts by mass of rubber within the rubber composition, it is preferred that the amount of carbon black be not greater than 80 parts by mass, and more preferred that this be not greater than 60 parts by mass.

The rubber composition may further comprise stearic acid, zinc oxide, antioxidant, wax, sulfur, vulcanization accelerator, and/or the like. It is preferred that the amount of the sulfur, expressed as equivalent sulfur content, be 0.5 part by mass to 5 parts by mass for every 100 parts by mass of rubber within the rubber composition. It is preferred that the amount of vulcanization accelerator be 0.1 part by mass to 5 parts by mass for every 100 parts by mass of rubber within the rubber composition.

The rubber composition may be used to fabricate a tire. More specifically, it is capable of being used in fabricating tire member(s) making up a tire. For example, the rubber composition may be used in fabricating tread rubber, sidewall rubber, chafer rubber, bead filler rubber, and/or the like.

The tire manufacturing method in accordance with the first embodiment comprises an operation in which an unvulcanized tire fabricated from the rubber composition is vulcanized and molded. The unvulcanized tire is provided with tire member(s) fabricated from the rubber composition. That is, the unvulcanized tire is provided with tire member(s) comprising the rubber composition. The tire obtained by the method of the first embodiment might, for example, be a pneumatic tire.

As has been described up to this point, the masterbatch manufacturing method in accordance with the first embodiment will permit improvement in workability. The masterbatch manufacturing method in accordance with the first embodiment is such that because natural rubber latex, and rubber latex having a mass-average molecular weight that is less than the mass-average molecular weight of the natural rubber latex, are mixed, it is possible to reduce the Mooney viscosity of the masterbatch, and/or of the unvulcanized rubber fabricated with the masterbatch, as compared with that which would exist were this rubber latex not added thereto. Moreover, the masterbatch manufacturing method in accordance with the first embodiment is such that because Mw/Mn of the pre-slurry-mixing rubber latex is 6 to 10, it is possible to effectively reduce Mooney viscosity.

The masterbatch manufacturing method in accordance with the first embodiment will permit improvement in the tear strength of vulcanized rubber. It is thought that the reason for this may be that because the masterbatch manufacturing method in accordance with the first embodiment makes it possible to reduce the Mooney viscosity of the masterbatch, and/or of the unvulcanized rubber fabricated with the masterbatch, this may make it possible to reduce occurrence of excessive breakage of molecular chains in rubber during kneading.

The masterbatch manufacturing method in accordance with the first embodiment will permit improvement in tear strength and workability while maintaining reduced heat generation. As to why reduced heat generation can be maintained, it is thought firstly that this may occur as a result of restriction in the amount or percentage of low molecular weight rubber within the pre-slurry-mixing rubber latex due to the fact that the Mw/Mn of the pre-slurry-mixing rubber latex is not greater than 10. It is thought that a second reason for this may be that because the masterbatch manufacturing method in accordance with the first embodiment makes it possible to reduce the Mooney viscosity of the masterbatch, and/or of the unvulcanized rubber fabricated with the masterbatch, this may make it possible to reduce occurrence of excessive breakage of molecular chains in rubber during kneading.

Variation 1

Whereas in accordance with the first embodiment rubber latex (rubber latex having a mass-average molecular weight that is less than the mass-average molecular weight of natural rubber latex) is added to natural rubber latex, and this is agitated to obtain pre-slurry-mixing rubber latex, in accordance with a first variation on the first embodiment rubber latex is added to natural rubber latex, this is agitated, another rubber latex is further added thereto, and this is agitated if necessary to obtain pre-slurry-mixing rubber latex.

Variation 2

Whereas in accordance with the first embodiment rubber latex (rubber latex having a mass-average molecular weight that is less than the mass-average molecular weight of natural rubber latex) is added to natural rubber latex, and this is agitated to obtain pre-slurry-mixing rubber latex, in accordance with a second variation on the first embodiment rubber latex and another rubber latex are added to natural rubber latex, and this is agitated to obtain pre-slurry-mixing rubber latex.

Variation 3

Whereas in accordance with the first embodiment carbon black and water are mixed to obtain a carbon black slurry, in accordance with a third variation on the first embodiment, instead of this procedure, carbon black and rubber latex (hereinafter, rubber latex for mixing with carbon black is referred to as "dilute rubber latex") are mixed to obtain a carbon black slurry. Mixing the carbon black and the dilute rubber latex makes it possible to prevent reflocculation of carbon black. This is thought to be due to formation of an extremely thin latex phase on all or part of the surface of the carbon black, the latex phase inhibiting reflocculation of carbon black. In the dilute rubber latex, rubber particles are dispersed in colloidal fashion in water. The dilute rubber latex might, for example, be natural rubber latex, synthetic rubber latex, and/or the like. The number-average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that the dry rubber content of the dilute rubber latex be not less than 0.1 mass %, more preferred that this be not less than 0.2 mass %, and still more preferred that this be not less than 0.3 mass %. The upper limit of the range in values for the dry rubber content might, for example, be 5 mass %, it being preferred that this be 2 mass %, and it being more preferred that this be 1 mass %.

Any one or more chosen from among these variations may of course be employed in combination with the first embodiment.

WORKING EXAMPLES

Working examples in accordance with the present disclosure are described below. Here, mass-average molecular weight is referred to as Mw, and number-average molecular weight is referred to as Mn.

Raw materials and reagents are indicated below.

| | |
|---|---|
| Natural Rubber Latex (natural rubber latex for which Mw was 2,200,000, Mw/Mn was 3.8, and dry rubber content was 30.5%) | Manufactured by Golden Hope |
| Isoprene Rubber Latex A | Isoprene rubber latex for which Mw was 2,000,000 Manufactured by Sumitomo Seika Chemicals Co., Ltd. |
| Isoprene Rubber Latex B | Isoprene rubber latex for which Mw was 30,000 |
| Isoprene Rubber Latex C | Isoprene rubber latex for which Mw was 900,000 |
| Isoprene Rubber Latex D | Isoprene rubber latex for which Mw was 400,000 |
| Carbon Black (N330; $N_2SA$ 93 $m^2/g$; dibutyl phthalate absorption 119 $cm^3/100$ g) | manufactured by Tokai Carbon Co., Ltd. |
| Zinc oxide | manufactured by Mitsui "Zinc Oxide Variety No. 2" Mining & Smelting Co., Ltd. |
| Antioxidant | "NOCRAC 6C" (6 PPD) manufactured by Ouchi Shinko Chemical Industrial Co., Ltd. |
| Stearic acid | "LUNAC S-20" manufactured by Kao Corporation |
| Wax | "OZOACE 0355" manufactured by Nippon Seiro Co., Ltd. |
| Sulfur | "Powdered Sulfur" manufactured by Tsurumi Chemical Industry Co., Ltd. |
| Vulcanization accelerator | "Soxil CZ" manufactured by Sumitomo Chemical Co., Ltd. |

Fabrication of Isoprene Rubber Latexes B-D

Periodic acid (metaperiodic acid ($HIO_4$)) was added to Isoprene Rubber Latex A to obtain Isoprene Rubber Latexes B-D.

Measurement of Mw and Mn 10 mass % of formic acid was added to the Pre-Slurry-Mixing Rubber Latexes, described below, in an amount sufficient to achieve a pH of 4 and cause coagulation thereof, and these were dried to obtain dry rubber. The dry rubber was dissolved in tetrahydrofuran, and measurement was carried out by causing this to be subjected to size-exclusion chromatography. The same method was employed to measure the molecular weights of Natural Rubber Latex and of Isoprene Rubber Latexes A-D.

TABLE 1

Pre-Slurry-Mixing Rubber Latexes

|  | Comparative Examples | | Working Examples | |
|---|---|---|---|---|
|  | 1 | 2 | 1 | 2 |
| Mw/Mn | 3 | 15 | 6 | 10 |

Fabrication of Masterbatch

The Isoprene Rubber Latexes were added to Natural Rubber Latex in accordance with TABLE 2, and these were agitated to obtain pre-slurry-mixing rubber latexes. Furthermore, carbon black was added to water and this was agitated to obtain carbon black slurry. The carbon black slurry was added to the pre-slurry-mixing rubber latexes in accordance with TABLE 2, these were agitated, and formic acid serving as coagulant was added in an amount sufficient to achieve a pH of 4 to obtain coagula. A squeezer-type single-screw dewatering extruder (Model V-02 screw press manufactured by Suehiro EPM Corporation) was used at 200° C. to dewater the coagula to obtain masterbatches.

TABLE 2

Masterbatches

|  |  |  | Comparative Examples | | Working Examples | |
|---|---|---|---|---|---|---|
|  |  |  | 1 | 2 | 1 | 2 |
| Parts by mass | Pre-Slurry-Mixing Rubber Latexes | Natural Rubber Latex (dry rubber content) | 70 | 70 | 70 | 70 |
|  |  | Isoprene Rubber Latex A (dry rubber content) | 30 | — | — | — |
|  |  | Isoprene Rubber Latex B (dry rubber content) | — | 30 | — | — |
|  |  | Isoprene Rubber Latex C (dry rubber content) | — | — | 30 | — |
|  |  | Isoprene Rubber Latex D (dry rubber content) | — | — | — | 30 |
|  | Carbon black |  | 50 | 50 | 50 | 50 |

Fabrication of Unvulcanized Rubber

The compounding ingredients except for sulfur and vulcanization accelerator were added to the masterbatch in accordance with TABLE 3, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Mooney Viscosity

In accordance with JIS K 6300, unvulcanized rubber was preheated at 100° C. for 1 minute, following which the rotor was made to rotate, the value of the torque 4 minutes after the start of rotation being recorded in Mooney units. The Mooney viscosities of the respective Examples are shown as indexed relative to a value of 100 for the Mooney viscosity obtained at Comparative Example 1. The smaller the index the lower the Mooney viscosity and the more excellent the workability.

Heat Generation

Unvulcanized rubber was vulcanized at 150° C. for 30 min, and tan δ of the vulcanized rubber was evaluated in accordance with JIS K-6394. tan δ was measured using a viscoelasticity testing machine manufactured by Toyo Seiki under conditions of temperature 60° C., frequency 10 Hz, initial strain 10%, and dynamic strain 1%. tan δ of the respective Examples are shown as indexed relative to a value of 100 for the tan δ obtained at Comparative Example 1. The lower the index the less the tendency for heat generation to occur, this being indicative of more excellent ability to achieve reduction in fuel consumption when used as a tire.

Tear Strength

The unvulcanized rubber was vulcanized at 150° C. for 30 min, and test pieces were fabricated from the vulcanized rubber. The force required to tear the test piece was measured in accordance with JIS K 6252. Tear strength of the respective Examples is shown as indexed relative to a value of 100 for the tear strength obtained at Comparative Example 1. The higher the index the more excellent the tear strength.

TABLE 3

|  |  | Comparative Examples | | Working Examples | |
|---|---|---|---|---|---|
|  |  | 1 | 2 | 1 | 2 |
| Parts by mass | Masterbatch | 150 | 150 | 150 | 150 |
|  | Zinc oxide | 3 | 3 | 3 | 3 |
|  | Antioxidant | 2 | 2 | 2 | 2 |
|  | Stearic acid | 2 | 2 | 2 | 2 |
|  | Wax | 2 | 2 | 2 | 2 |
|  | Sulfur | 2 | 2 | 2 | 2 |
|  | Vulcanization accelerator | 2 | 2 | 2 | 2 |
| Evaluation | Mooney viscosity | 100 | 74 | 83 | 90 |
|  | Heat generation | 100 | 121 | 100 | 99 |
|  | Tear strength | 100 | 95 | 104 | 108 |

Mooney viscosity of unvulcanized rubber at Working Examples 1 and 2 was lower than that of Comparative Example 1. That is, workability of unvulcanized rubber at Working Examples 1 and 2 was superior to that of Comparative Example 1.

Tear strength of vulcanized rubber at Working Examples 1 and 2 was superior to that of the vulcanized rubber at Comparative Example 1. Heat generation of vulcanized rubber at Working Examples 1 and 2 was equivalent to that of the vulcanized rubber at Comparative Example 1.

On the other hand, heat generation and tear strength of vulcanized rubber at Comparative Example 2 were inferior to those of the vulcanized rubber at Comparative Example 1.

The invention claimed is:

1. A masterbatch manufacturing method comprising:
   an operation in which a natural rubber latex, and a rubber latex having a mass-average molecular weight that is less than a mass-average molecular weight of the natural rubber latex, are mixed to obtain a pre-slurry-mixing rubber latex for which a mass-average-molecular-weight-to-number-average-molecular-weight ratio is 6 to 10;
   an operation in which the pre-slurry-mixing rubber latex and a filler slurry are mixed to obtain a pre-coagulation liquid mixture; and
   an operation in which the pre-coagulation liquid mixture is coagulated.

2. The masterbatch manufacturing method according to claim 1 wherein difference between the mass-average molecular weight of the natural rubber latex and the mass-average molecular weight of the rubber latex is 1,000,000 to 1,700,000.

3. The masterbatch manufacturing method according to claim 1 wherein the mass-average molecular weight of the natural rubber latex is not less than 2,000,000.

4. The masterbatch manufacturing method according to claim 1 wherein the mass-average molecular weight of the rubber latex is not greater than 1,200,000.

5. The masterbatch manufacturing method according to claim 1 wherein the mass-average molecular weight of the rubber latex is not less than 100,000 but not greater than 1,200,000.

6. The masterbatch manufacturing method according to claim 1 wherein the mass-average molecular weight of the rubber latex is not greater than 1,000,000.

7. The masterbatch manufacturing method according to claim 1 wherein the mass-average molecular weight of the rubber latex is not less than 200,000 but not greater than 1,000,000.

8. The masterbatch manufacturing method according to claim 1 wherein, for every 100 parts by mass of dry rubber content in the natural rubber latex, dry rubber content of the rubber latex is not less than 10 parts by mass but not greater than 70 parts by mass.

9. The masterbatch manufacturing method according to claim 1 wherein, for every 100 parts by mass of dry rubber content in the natural rubber latex, dry rubber content of the rubber latex is not less than 20 parts by mass but not greater than 50 parts by mass.

10. The masterbatch manufacturing method according to claim 1 wherein the filler slurry is a carbon black slurry.

11. The masterbatch manufacturing method according to claim 1 further comprising an operation in which a coagulum obtained by the coagulation of the pre-coagulation liquid mixture is dewatered.

12. The masterbatch manufacturing method according to claim 1 further comprising an operation in which an extruder is used to cause a coagulum obtained by the coagulation of the pre-coagulation liquid mixture to be dewatered.

13. A rubber composition manufacturing method comprising:
　an operation in which the masterbatch manufacturing method according to claim 1 is used to manufacture a masterbatch; and
　an operation in which the masterbatch and a compounding ingredient are kneaded together.

14. The rubber composition manufacturing method according to claim 13 further comprising an operation in which a vulcanizing-type compounding ingredient is kneaded into a rubber mixture obtained at the operation in which the masterbatch and the compounding ingredient are kneaded together.

15. A tire manufacturing method comprising:
　an operation in which the rubber composition manufacturing method according to claim 13 is used to manufacture a rubber composition; and
　an operation in which an unvulcanized tire provided with a tire member fabricated from the rubber composition is vulcanized and molded.

* * * * *